(12) United States Patent
Austin

(10) Patent No.: US 8,416,062 B2
(45) Date of Patent: Apr. 9, 2013

(54) METHOD AND APPARATUS FOR IMPROVING RFID TAG READING

(75) Inventor: Timothy B. Austin, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 470 days.

(21) Appl. No.: 12/626,999

(22) Filed: Nov. 30, 2009

(65) Prior Publication Data

US 2011/0128128 A1    Jun. 2, 2011

(51) Int. Cl.
*H04Q 5/22* (2006.01)

(52) U.S. Cl.
USPC ....... 340/10.3; 340/425.1; 342/350; 343/725; 343/833

(58) Field of Classification Search .................. 340/10.3
See application file for complete search history.

(56) References Cited

U.S. PATENT DOCUMENTS

| | | | |
|---|---|---|---|
| 4,937,585 A * | 6/1990 | Shoemaker | 343/700 MS |
| 5,528,222 A * | 6/1996 | Moskowitz et al. | 340/572.7 |
| 6,121,544 A | 9/2000 | Petsinger | |
| 6,794,000 B2 | 9/2004 | Adams et al. | |
| 7,289,884 B1 | 10/2007 | Takahashi et al. | |
| 7,369,048 B2 | 5/2008 | Freund | |
| 2002/0024421 A1 | 2/2002 | Kang | |
| 2004/0095244 A1 * | 5/2004 | Conwell et al. | 340/572.8 |
| 2006/0028379 A1 * | 2/2006 | Oberle | 343/700 MS |
| 2006/0043199 A1 * | 3/2006 | Baba et al. | 235/492 |
| 2006/0103532 A1 | 5/2006 | Van Fleet | |
| 2006/0132312 A1 | 6/2006 | Tavormina | |
| 2006/0226989 A1 * | 10/2006 | Hillegass | 340/572.7 |
| 2007/0152830 A1 * | 7/2007 | Burr | 340/572.7 |
| 2007/0257800 A1 | 11/2007 | Yang et al. | |
| 2008/0087723 A1 | 4/2008 | Kargl et al. | |
| 2008/0088415 A1 | 4/2008 | Quan | |

(Continued)

FOREIGN PATENT DOCUMENTS

EP    1865438 A1    12/2007

OTHER PUBLICATIONS

International Search Report and Written Opinion for International Application No. PCT/US2010/055551 mailed on Feb. 9, 2011.

(Continued)

*Primary Examiner* — Daniel Wu
*Assistant Examiner* — Frederick Ott

(57) ABSTRACT

An apparatus and method for improving RFID tag reading. The apparatus includes a substrate element having a predetermined active area, and a plurality of resonant elements each having a resonant frequency, a quality factor, and a response band. The resonant elements are distributed within the predetermined active area of the substrate element for scattering interrogation electromagnetic waves radiated thereupon from the RFID reader. At least one resonant element has a null-direction thereof orientated in a direction that is substantially orthogonal to a line extending from a center of the resonant element to a center of an antenna of the RFID reader.

20 Claims, 6 Drawing Sheets

U.S. PATENT DOCUMENTS

| | | |
|---|---|---|
| 2008/0100450 A1 | 5/2008 | Ayyagari et al. |
| 2008/0238621 A1 | 10/2008 | Rofougaran et al. |
| 2008/0290993 A1 | 11/2008 | Ryoo et al. |
| 2008/0309463 A1 | 12/2008 | Godzwon et al. |
| 2009/0160612 A1 | 6/2009 | Varpula et al. |
| 2009/0167502 A1 | 7/2009 | Erickson et al. |
| 2009/0174556 A1 | 7/2009 | Horne et al. |
| 2009/0179742 A1 | 7/2009 | Takeshima et al. |
| 2009/0184802 A1 | 7/2009 | Park |
| 2009/0219158 A1* | 9/2009 | Nikitin et al. ............. 340/572.7 |
| 2009/0295645 A1* | 12/2009 | Campero et al. ....... 343/700 MS |
| 2010/0097273 A1* | 4/2010 | Biris et al. ................ 343/700 R |
| 2010/0289617 A1 | 11/2010 | Hill |
| 2011/0089634 A1 | 4/2011 | Thorson et al. |

OTHER PUBLICATIONS

International Preliminary Report on Patentability and Written Opinion for International Patent Application No. PCT/US2010/055551 mailed on Jun. 5, 2012.

Notice of Allowance mailed Jun. 26, 2012 in U.S. Appl. No. 12/627,023, David E. Bellows, filed Nov. 30, 2009.

Notice of Allowance mailed Sep. 4, 2012 in U.S. Appl. No. 12/627,023, David E. Bellows, filed Nov. 30, 2009.

Notice of Allowance mailed on Dec. 10, 2012 in related U.S. Appl. No. 12/627,023, David E. Bellows, filed on Nov. 30, 2009.

* cited by examiner

US 8,416,062 B2

METHOD AND APPARATUS FOR IMPROVING RFID TAG READING

FIELD OF THE DISCLOSURE

The present disclosure relates generally to RFID technology.

BACKGROUND

RFID technology generally involves interrogating an RFID tag with radio frequency (RF) waves and reading the responding RF waves with an RFID reader. An RFID tag typically includes a miniscule microchip coupled to an RF antenna. RFID tags can be attached to the object to be identified. An RFID reader typically includes an antenna coupled to a transmitter and a receiver.

In many implementations, the antenna for the RFID tag has a null-direction in which no RF wave is radiated. For example, the radiation from a dipole antenna follows a toroidal radiation pattern with the central axis of the toroid representing the null-direction of the dipole antenna. When an RFID tag is located in the radiation range of the RFID reader, the electrical filed of the RF waves is generally transverse to the direction of propagation. The RFID tag tends to responds most to interrogating RF waves from the RFID reader when the null-direction of the antenna for the RFID tag is also transverse to the propagation direction of the interrogating RF waves. For example, as shown in FIG. 1A, interrogating RF waves with the x-polarization are generated by the RFID reader 20, and the RFID tag 60 tends to response most when the null-direction 65 of the antenna is also aligned in the x-direction. In another example, as shown in FIG. 1B, interrogating RF waves with the circular polarization are generated by the RFID reader 20, and the RFID tag 60 tends to response most when the null-direction 65 of the antenna is transverse to the propagation direction of the interrogating RF waves.

The RFID tag tends not to response to the interrogating RF waves from the RFID reader when the null-direction of the antenna for the RFID tag is aligned in the propagation direction of the interrogating RF waves. For example, as shown in FIGS. 2A-2B, the RFID tag 60 tends not to response to the interrogating RF waves when the null-direction 65 of its antenna is aligned in the z-direction, the propagation direction. Consequently, it can be difficult to read some of the RFID tags placed in front of an RFID reader when these RFID tags are incorrectly aligned with RFID reader. There is a need for a method and apparatus for improving the reading of RFID tags with RFID readers.

SUMMARY

In one aspect, the invention is directed to an apparatus for scattering interrogation electromagnetic waves emitted from an RFID reader at one or more interrogation frequencies. The apparatus includes a substrate element having a predetermined active area, and a plurality of resonant elements each having a resonant frequency, a quality factor, and a response band. The resonant elements are distributed within the predetermined active area of the substrate element for scattering interrogation electromagnetic waves radiated thereupon from the RFID reader. At least one resonant element has a null-direction thereof orientated in a direction that is substantially orthogonal to a line extending from a center of the resonant element to a center of an antenna of the RFID reader.

Implementations of the invention can include one or more of the following advantages. The reading of RFID tags with RFID readers can be improved even when some of these RFID tags can be difficult to read without using the newly invented apparatus. These and other advantages of the present invention will become apparent to those skilled in the art upon a reading of the following specification of the invention and a study of the several figures in the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
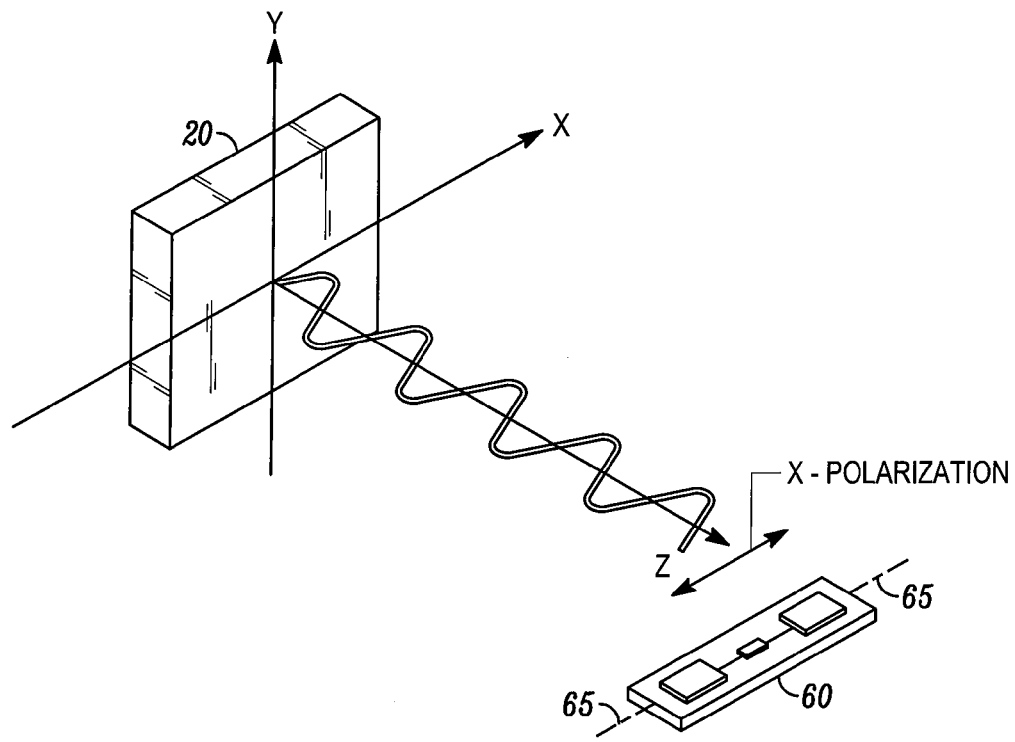
FIGS. 1A-1B depict that the RFID tag tends to responds most to interrogating RF waves when the null-direction of the antenna of the RFID tag is orientated orthogonal to the propagation direction of the interrogating RF waves.
Figure 1B:
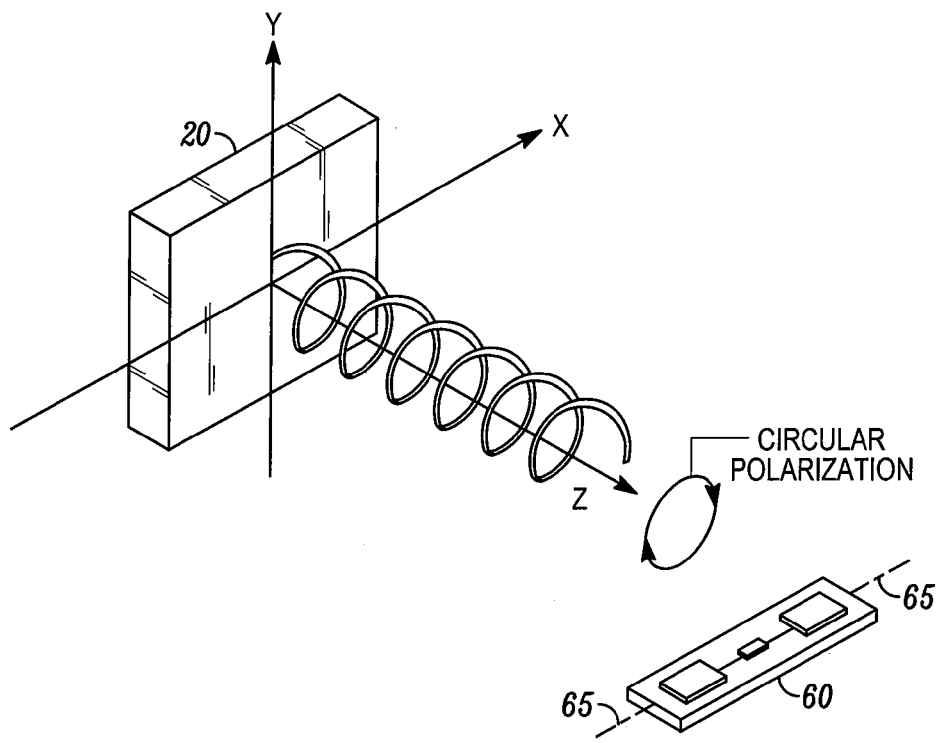
Figure 2A:
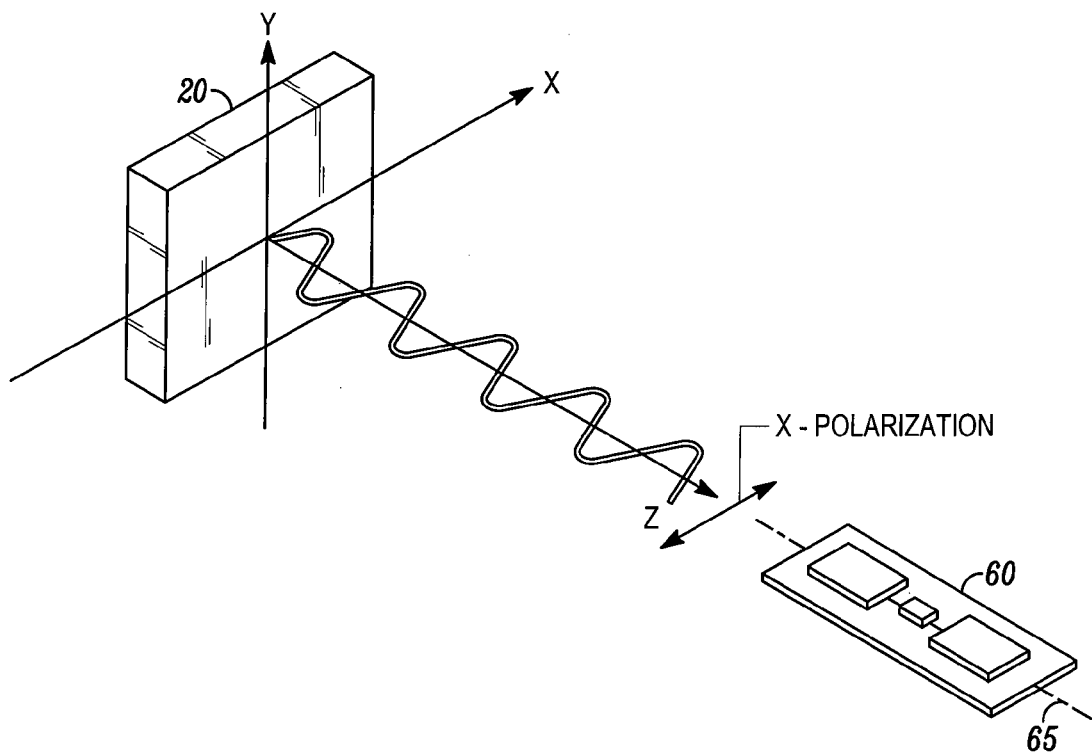
FIGS. 2A-2B depict that the RFID tag tends not to response to the interrogating RF waves when the null-direction of the antenna of the RFID tag is aligned with the propagation direction of the interrogating RF waves.
Figure 2B:
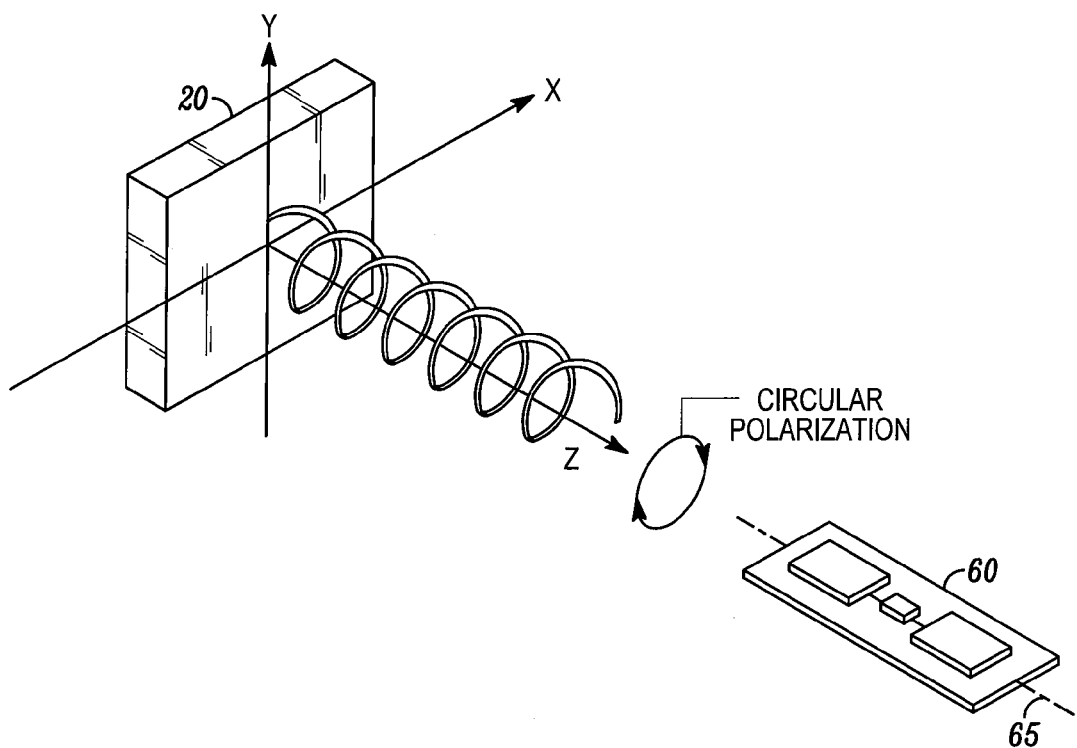

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 3:
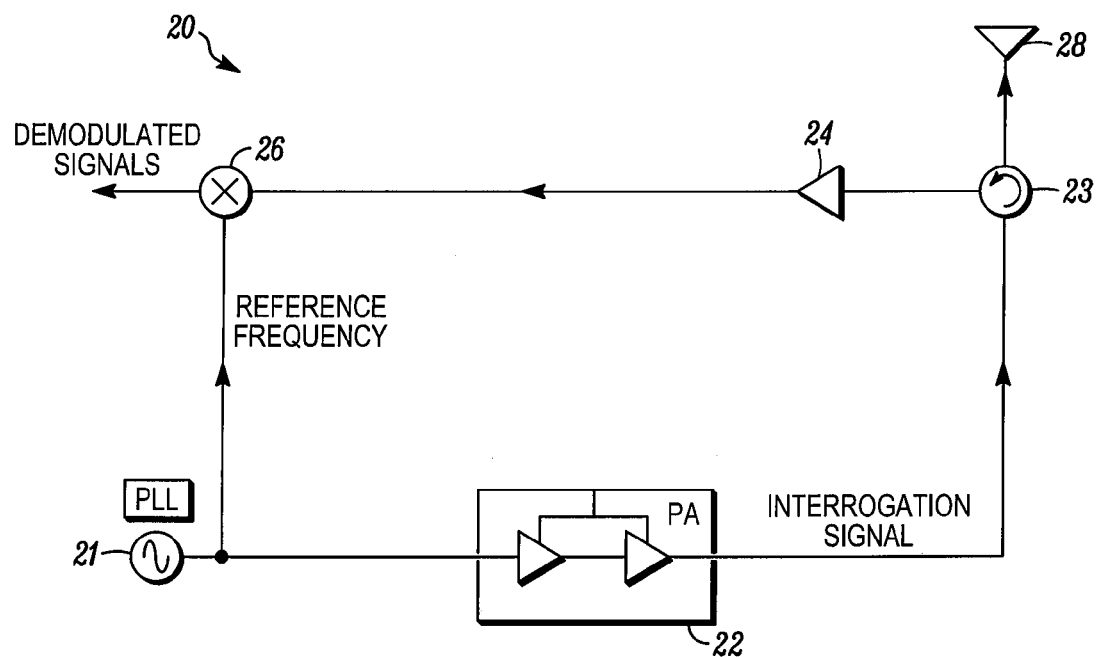
FIG. 3 shows a part of an RFID reader in one specific kind of implementation.

FIG. 3 shows a part of an RFID reader 20 in one specific kind of implementation. In FIG. 3, the RFID reader 20 includes an antenna 28 coupled to a transmitter 22 and a receiver 24. The RFID reader 20 also includes a circulator 23, a demodulator 26, and a frequency generator 21.

In operation, the transmitter 22 generates an RF interrogation signal. This RF interrogation signal is coupled to the antenna 28 through the circulator 23. The electromatic waves radiated from the antenna 28 are then received by the antenna in an RFID tag. In response to the interrogation from the RFID reader, the RF tag will reflect back some responding electromagnetic waves coded with the identification information of the RF tag. The responding electromatic waves are picked up by the antenna 28 as a responding RF signal. The responding RF signal enters the circulator 23 and is received by the receiver 24. The RF signal received by the receiver, after amplification, is demodulated with demodulator 26 that receives a reference RF signal from the frequency generator 21. The demodulated signals from the demodulator 26 is coupled to certain signal processing circuit to decode from the demodulated signal the identification information returned by the RF tag.

In some implementations, the demodulator 26 is a dual quadrature demodulator, and the demodulated signals from the demodulator 26 can be a demodulated vector signal that includes two components, the in-phase demodulated signal $I_{rx}$ and the quadrature demodulated signal $Q_{rx}$. This demodulated vector signal can be coupled to certain signal processing circuit for further signal processing.

The RFID reader 20 can be used as a stand alone device or can be added to other data capture devices. For example, the RFID reader 20 can be installed at a checkout workstation that may have an optical barcode reader installed also. The RFID reader 20 can also be added to a handheld device, such as, an optical barcode reader. In some implementations, the handheld device having the RFID reader 20 can be operated in both the handheld mode and the workstation mode.

Figure 4:
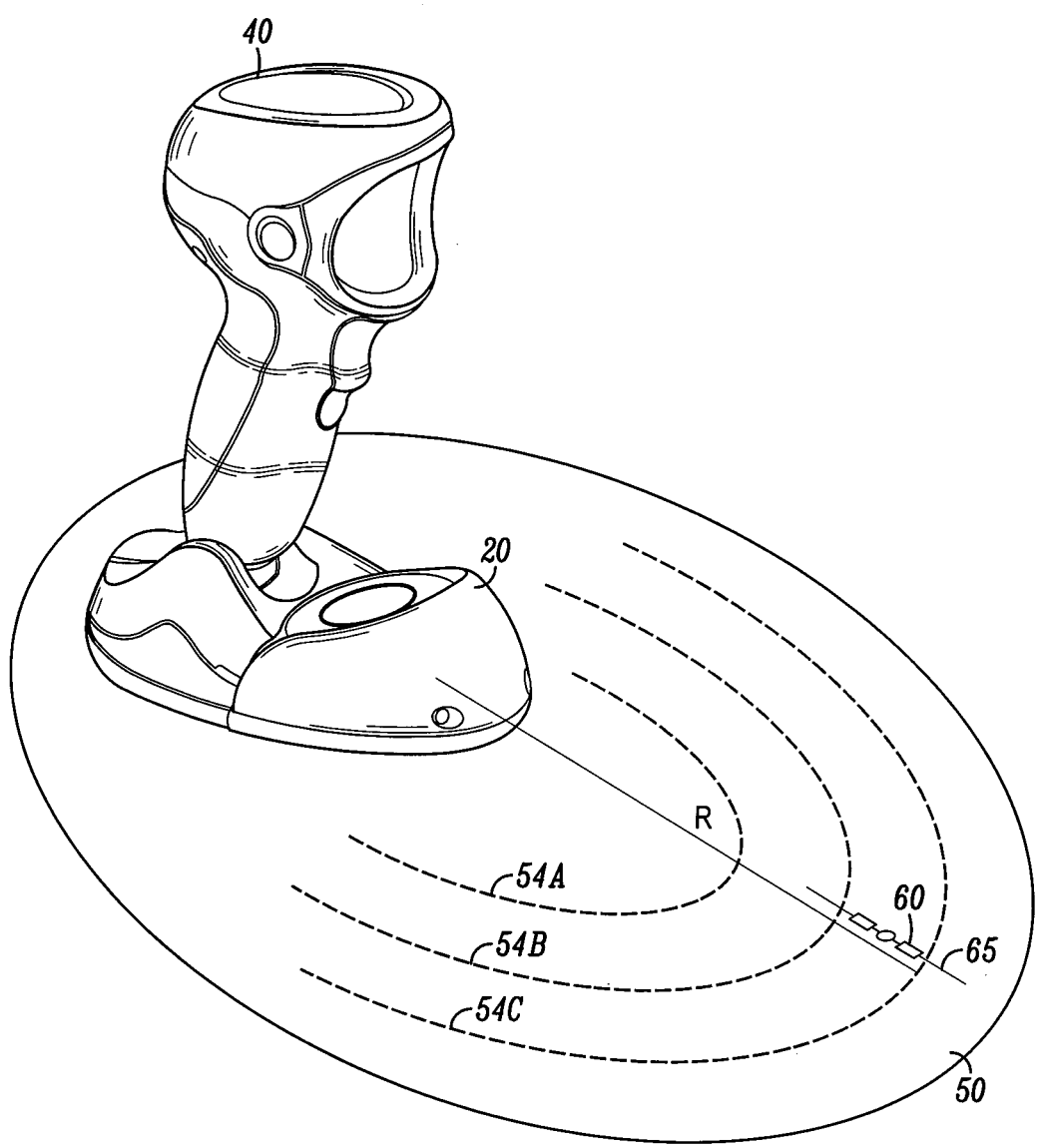
FIG. 4 depicts an RFID reader that is placed on a substrate element to function as a stationary workstation in accordance with some embodiments.

FIG. 4 depicts an RFID reader 20 that is placed on a substrate element 50 to function as a stationary workstation in accordance with some embodiments. In its simplest form, this substrate may be a two dimensional flat sheet; in more complex implementations, the substrate could be a more complex three dimensional shape. In some implementations, one or more contours can be printed on the substrate element 50 as zone-boundary marks (e.g., 54A, 54B, or 54C). Each zone-boundary mark on the substrate element 50 can be used to indicate a corresponding read zone with a predetermined field strength. In some implementations, the substrate element 50 can have no contours printed as zone-boundary marks. In some implementations, the substrate element 50 can have a specially designed shape such that its edge can be used as a zone-boundary mark. In some implementations, the substrate element 50 can have other kinds of shapes, such as the shape of a square or rectangular.

In FIG. 4, an RFID tag 60 is placed at a distance R from the center of the antenna in the RFID reader 20, and the null-direction 65 of antenna in the RFID tag 60 is pointing towards the RFID reader 20. If the substrate element 50 is simply a piece of uniform material and contains no other RF scattering elements, the RFID reader 20 may not be able to read the RFID tag 60 effectively, because the null-direction 65 is aligned with the propagation direction of the interrogating RF waves from the RFID reader 20.

Figure 5A:
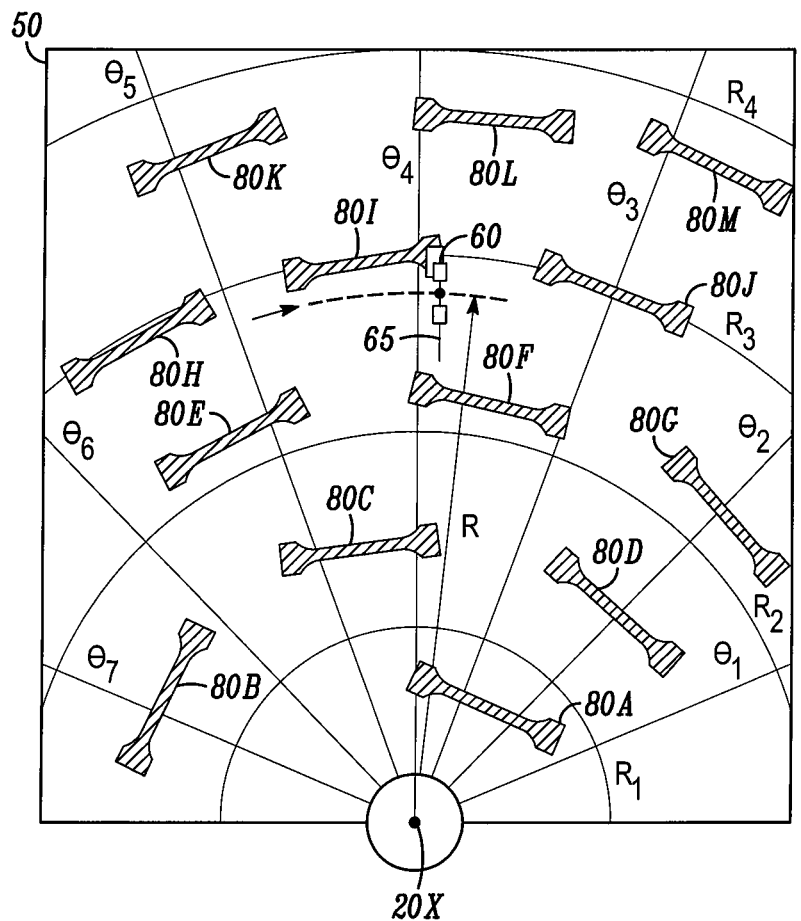
FIGS. 5A-5B depict that multiple resonant elements are distributed on the substrate element for improving the reading capabilities of the RFID reader in accordance with some embodiments.
Figure 5B:
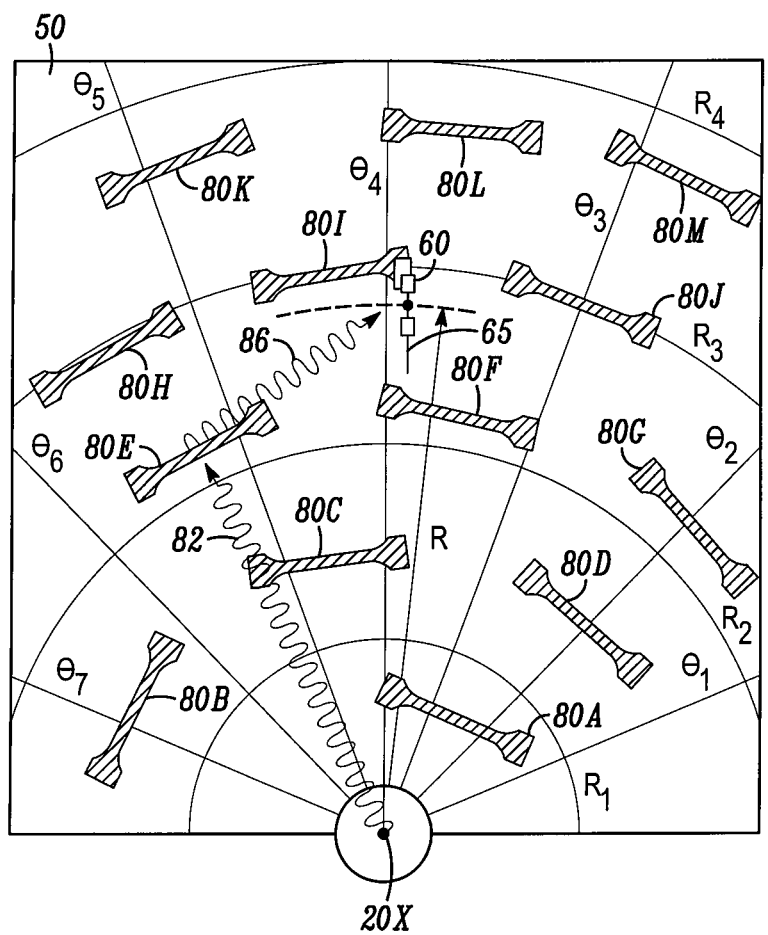

FIGS. 5A-5B depict that multiple resonant elements (e.g., 80A, 80B, . . . 80L, and 80M) are distributed on the substrate element 50 for improving the reading capabilities of the RFID reader in accordance with some embodiments. A polar coordinate system with a pole 20X is also shown in the figures, along with some radial coordinates (e.g., $R_1$, $R_2$, $R_3$, and $R_4$) and angular coordinates (e.g., $\theta_1$, $\theta_2$, . . . , and $\theta_7$). The pole 20X also denotes the center of the antenna in the RFID reader 20 when it is placed on the substrate element 50.

In FIGS. 5A-5B, the multiple resonant elements (e.g., 80A, 80B, . . . 80L, and 80M) are distributed within a predetermined active area of the substrate element 50 for scattering interrogation RF waves emitted from the RFID reader 20. The interrogation frequencies of the RF waves emitted from the RFID reader 20 can be in the range from 300 MHz to 3,000 MHz. In some implementations, the null-direction of each resonant element (e.g., 80E) is orientated in a direction that is substantially orthogonal to the polar axis (e.g., the polar axis along the direction $\theta_5$). In other implementations, the null-direction of some resonant elements is orientated in a direction that is substantially orthogonal to the polar axis. In still other implementations, the null-direction of a resonant element can also be orientated in some other directions. In general, the null-direction of a resonant element is the orientation that the resonant element has the minimum response if RF waves are radiated upon it. As a specific example, if the resonant element is a dipole antenna, the null-direction of this the resonant element matches with the central axis of the toroidal radiation pattern from the dipole antenna. For a dipole antenna, there is no radiation along this central axis. But, in general, the null-direction of a resonant element does not have to be the direction along which no RF waves are radiated.

In FIGS. 5A-5B, each resonant element (e.g., 80E) has a resonant frequency, a quality factor, and a response band. The response band is centered at the resonant frequency with a bandwidth that is the ratio between the resonant frequency and the quality factor. At least one of the interrogation frequencies of the RFID reader is within the response band of a resonant element. The resonant element can be made of a conducting material, such as, Copper. In general, the conducting material can have a resistivity that is smaller than $1.0 \times 10^{-7}$ ohm meter.

In some of the implementations, the substrate element 50 can have a predetermined active area with a size between 0.1 square meters ($0.1 \text{ m}^2$) to 400 square meters ($400 \text{ m}^2$). The substrate element 50 can be made of a material that has a loss tangent at one of the interrogation frequencies of the RFID reader. The material for making the substrate element 50 can be UHMW polyethylene, HDPE, LDPE, Polypropylene, or Polyolefin modified elastomer. In general, the loss tangent at one of the interrogation frequencies of the RFID reader can be smaller than $10^{-3}$ at one of the interrogation frequencies.

In some implementations, the resonant element (e.g., 80E) can be printed on the substrate element 50 with conductive ink. The resonant element (e.g., 80E) can also be printed on other surfaces other than the substrate element 50. In some implementations, the resonant element (e.g., 80E) can be made in the form of a self-adhesive label that can be glued on the substrate element 50. In still some implementations, the resonant element (e.g., 80E) can be molded into the substrate element 50.

In FIGS. 5A-5B, the interrogating RF waves from the RFID reader 20 propagate generally in the direction along the polar axis at any given location that is in the radiation field range (i.e., those positions at which the distance to the RFID reader 20 is much large than the wavelength of the RF waves). The RFID reader may have difficulty to read the RFID tag 60 that has its null-direction orientated along the polar axis at a distance R from the pole 20X, if no resonant element has been placed on the substrate element 50. However, when the resonant elements (e.g., 80A, 80B, . . . 80L, and 80M) are distributed on the substrate element 50, the interrogation RF waves emitted from the RFID reader 20 can be scattered by these the resonant elements, and it may become possible for the RFID reader to read the RFID tag 60 that has its null-direction orientated along the polar axis. As shown in FIG. 5B, the interrogation RF waves 82 emitted from the RFID reader 20 can be scattered by the resonant element 50E, because the null-direction of the resonant element 80E is orthogonal to the propagation direction of the interrogation RF waves 82. The scattered RF waves 86 by the resonant element 80E propagate in a direction that is not aligned with the null-direction of the RFID tag 60; therefore, the scattered RF waves 86 can now be received by the RFID tag 60. In response to the scattered RF waves 86, the RFID tag 60 can emit some responding electromagnetic waves coded with some identification information, and these responding electromagnetic waves are then received by the RFID reader 20 located at the pole 20X.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus for scattering interrogation electromagnetic waves emitted from an RFID reader at one or more interrogation frequencies, the apparatus comprising:
a substrate element having a predetermined area;
a plurality of unconnected resonant elements each having a resonant frequency, a quality factor, and a response band, the response band being centered at the resonant frequency with a bandwidth defined as the ratio between the resonant frequency and the quality factor, wherein at least one of the interrogation frequencies is within the response band of each resonant element;
wherein the plurality of resonant elements are distributed with different orientations within the predetermined area of the substrate element for scattering interrogation electromagnetic waves radiated from an antenna of the RFID reader to one or more RFID tags; and
wherein at least one resonant element of the plurality of resonant elements is operable to scatter the interrogation electromagnetic waves from the RFID reader to at least one RFID tag of the one or more RFID tags, the at least one RFID tag having a null-direction of an antenna aligned to a direct propagation direction of the interrogation electromagnetic waves radiated from the RFID reader to the at least one RFID tag, and further wherein the at least one resonant element has a null-direction of an antenna orientated in a direction that is substantially orthogonal to a line extending from a center of the at least one resonant element to a center of the antenna of the RFID reader.

2. The apparatus of claim 1, wherein the predetermined area of the substrate element has a size between 0.1 square meters (0.1 m$^2$) to 400 square meters (400 m$^2$).

3. The apparatus of claim 1, wherein the one or more interrogation frequencies are in the range from 300 MHz to 3,000 MHZ.

4. The apparatus of claim 1, wherein the substrate element is made of a material that has a loss tangent smaller than $10^{-3}$ at one of the interrogation frequencies of the interrogation electromagnetic waves.

5. The apparatus of claim 1, wherein the material of the substrate element comprises at least one of UHMW polyethylene, HDPE, LDPE, Polypropylene, and Polyolefin modified elastomer.

6. The apparatus of claim 1, wherein the shape of the substrate element is a two dimensional sheet.

7. The apparatus of claim 1, wherein the shape of the substrate element is a three dimensional shape.

8. The apparatus of claim 1, wherein the plurality of resonant elements comprises a resonant element made of a conducting material that has resistivity smaller than $1.0 \times 10^{-7}$ ohm meter.

9. The apparatus of claim 1, wherein the plurality of resonant elements comprises a resonant element made of Copper.

10. The apparatus of claim 1, wherein a resonant element includes a dipole antenna.

11. The apparatus of claim 1, wherein the plurality of resonant elements comprises a resonant element orientated in an optimal direction for maximizing the scattering of the interrogation electromagnetic waves radiated from the antenna of the RFID reader.

12. The apparatus of claim 1, wherein the plurality of resonant elements are distributed within the predetermined area of the substrate element in such a way that each resonant element is orientated in an optimal direction for maximizing the scattering of the interrogation electromagnetic waves radiated from the antenna of the RFID reader.

13. The apparatus of claim 1, wherein the plurality of resonant elements are distributed within the predetermined area of the substrate element in such a way that each resonant element has a null-direction of an antenna orientated in a direction that is substantially orthogonal to a line extending from a center of the resonant element to a center of the antenna of the RFID reader.

14. A method for scattering interrogation electromagnetic waves emitted from an RFID reader at one or more interrogation frequencies, the method comprising:

selecting a plurality of unconnected resonant elements each having a resonant frequency, a quality factor, and a response band, the response band being centered at the resonant frequency with a bandwidth defined as the ratio between the resonant frequency and the quality factor, wherein at least one of the interrogation frequencies is within the response band of each resonant element;

distributing the plurality of resonant elements with different orientations within a predetermined area of a substrate element, wherein at least one resonant element of the plurality of resonant elements is operable to scatter the interrogation electromagnetic waves from the RFID reader to at least one RFID tag of the one or more RFID tags, the at least one RFID tag having a null-direction of an antenna aligned to a direct propagation direction of the interrogation electromagnetic waves radiated from the RFID reader to the at least one RFID tag; and positioning the plurality of resonant elements on the substrate element in such a way that the at least one resonant element has a null-direction of an antenna orientated in a direction that is substantially orthogonal to a line extending from a center of the at least one resonant element to a center of the antenna of the RFID reader.

15. The method of claim 14, wherein the positioning step comprises:
printing conductive ink on the substrate element to form the plurality of resonant elements.

16. The method of claim 14, wherein the positioning step comprises:
constructing a resonant element in the form of a self-adhesive label for sticking on the substrate element.

17. The method of claim 14, wherein the positioning step comprises: molding a resonant element into the substrate element.

18. The method of claim 14, wherein the one or more interrogation frequencies are in the range from 300 MHz to 3,000 MHZ.

19. The method of claim 14, wherein the substrate element is made of a material that has a loss tangent smaller than $10^{-3}$ at one of the interrogation frequencies of the interrogation electromagnetic waves.

20. The method of claim 14, wherein the plurality of resonant elements comprises a resonant element made of a conducting material that has resistivity smaller than $1.0 \times 10^{-7}$ ohm meter.

* * * * *